(12) United States Patent  
Christensen (10) Patent No.: US 8,382,062 B2
(45) Date of Patent: Feb. 26, 2013

(54) ACTUATOR FOR A VALVE (75) Inventor: Ole Holst Christensen, Kolding (DK)

(73) Assignee: Danfoss A/S, Nordborg (DK)

( * ) Notice: Subject to any disclaimer, the term of this patent is extended or adjusted under 35 U.S.C. 154(b) by 397 days.

(21) Appl. No.: 12/665,955

(22) PCT Filed: Jun. 27, 2008

(86) PCT No.: PCT/DK2008/000242
§ 371 (c)(1),
(2), (4) Date: Jun. 16, 2010

(87) PCT Pub. No.: WO2009/003475
PCT Pub. Date: Jan. 8, 2009

(65) Prior Publication Data
US 2010/0288952 A1 Nov. 18, 2010

(30) Foreign Application Priority Data

Jun. 29, 2007 (DK) .................................. 2007 00955

(51) Int. Cl.
*F16K 31/02* (2006.01)
(52) U.S. Cl. ..................................... 251/129.15; 335/278
(58) Field of Classification Search ............. 251/129.15; 335/278, 282; 336/196–197
See application file for complete search history.

(56) References Cited

U.S. PATENT DOCUMENTS

| 3,295,079 A | * | 12/1966 | Brown | 335/255 |
| 3,350,974 A | | 11/1967 | Brown | |
| 3,727,160 A | * | 4/1973 | Churchill | 335/251 |
| 4,683,453 A | * | 7/1987 | Vollmer et al. | 335/255 |
| 4,805,870 A | * | 2/1989 | Mertz | 251/129.15 |
| 5,581,222 A | * | 12/1996 | Pinaud | 335/278 |
| 6,459,348 B1 | | 10/2002 | Birkelund | |
| 2007/0062591 A1 | | 3/2007 | Armour | |

FOREIGN PATENT DOCUMENTS

| GB | 217779 | 6/1924 |
| WO | 00/25069 A1 | 5/2000 |
| WO | 02/086918 A1 | 10/2002 |

OTHER PUBLICATIONS

International Search Report for PCT/DK2008/000242 dated Nov. 5, 2008.

* cited by examiner

*Primary Examiner* — John K Fristoe, Jr.
*Assistant Examiner* — Seth Faulb
(74) *Attorney, Agent, or Firm* — McCormick, Paulding & Huber LLP

(57) ABSTRACT

The invention provides an electromagnetic actuator for moving a closure member of a valve. The actuator contains a solenoid, a yoke and a wire spring for fixing a guide tube, in which the closure member is movable, to the solenoid. The spring is formed so that it further fixes the yoke to the solenoid. Accordingly, the number of components is reduced, and detaching of the yoke may easily be facilitated.

26 Claims, 9 Drawing Sheets

Fig. 17

ACTUATOR FOR A VALVE

CROSS REFERENCE TO RELATED APPLICATIONS

This application is entitled to the benefit of and incorporates by reference essential subject matter disclosed in International Patent Application No. PCT/DK2008/000242 filed on Jun. 27, 2008 and Danish Patent Application No. PA 2007 00955 filed Jun. 29, 2007.

FIELD OF THE INVENTION

The present invention relates to an electromagnetic actuator for moving a closure member in a guide tube of a valve. The actuator comprises a solenoid with a cylindrical cavity extending between a lower opening in a lower end face and an upper opening in an upper end face. The actuator further comprises a securing device attached in a recess in the upper end face and being engageable under spring force in an indentation in a guide tube which is located in the cavity, and a magnetic yoke with an inner surface towards the upper end face. The invention further relates to a spring for such an actuator, to a valve comprising such an actuator, and to a method of fixing a yoke and a guide tube to a solenoid by use of a single wire spring.

BACKGROUND OF THE INVENTION

An electromagnetic actuator for a valve is disclosed e.g. in U.S. Pat. No. 6,459,348 in which an axially introduced guide tube for a movable armature is held in a cavity of the actuator by use of spring force from a wire spring. The spring is located internally within the actuator.

Actuators for valves typically comprise a solenoid and a yoke which partly surrounds the solenoid to conduct a magnetic field to a desired location along the guide tube and thereby to ensure correct movement of the armature in the tube. The yoke is sometimes fixed inseparably to the solenoid, c.f. the abovementioned US-patent in which a capsule covers the solenoid and the yoke. This simplifies the design, maintains the yoke in correct position, and may further provide a desired appearance of the actuator. It may, however, sometimes be desired to provide the yoke as a separate part, or even to facilitate replacement of the yoke.

SUMMARY OF THE INVENTION

It is an object of an embodiment of the present invention to enable a simple and reliable fixation of the yoke to a solenoid. Accordingly, the invention provides an actuator in which the securing device comprises a portion being engageable in the yoke to provide fixing of the magnetic yoke to the solenoid.

Since the securing device is engageable both in the yoke and in the guide tube, the same spring can hold both the guide tube and the yoke in place.

By solenoid is meant an element containing a cylindrical coil of insulated wire that establishes a magnetic field in the presence of an electrical current. Typically, the solenoid, in addition, comprises a bobbin, around which the coil is wound, and sometimes also a potting in which the coil and bobbin are moulded to provide an electrically isolated single-piece component.

By yoke is meant an element which conducts the magnetic field generated by the coil, typically formed as an iron containing metal frame arranged to partly circumference the solenoid or at least partly to circumference the solenoid.

In one embodiment, the securing device may provide releasable fixation of a guide tube in the cavity and/or releasable fixation of the magnetic yoke to the solenoid.

The securing device may be located between the upper end face and the inner surface of the yoke, e.g. in a tubular passage between the end face and inner surface, e.g. a tubular passage provided by a recess in one or both of the end faces and inner surface so that the securing device is locked, squeezed, wedged or in any other manner held in fixed position between the solenoid an the yoke.

The securing device can be a wire spring, e.g. made by bending of a single piece of a wire, e.g. a metal wire, e.g. of the kind known from a paper clip etc. The wire spring may comprise a mid portion, an intermediate portion, and a flange portion.

The intermediate portion is defined as that portion which is held in the recess and which therefore fixes the wire spring to the solenoid when the yoke is attached thereto. The recess may e.g. be tangential to the cavity, i.e. at a right angle to a radial plane or parallel to the surface of the cavity or being in the same direction as a vector which follows the edge of an opening into the cavity.

The mid portion may be located in the cavity, e.g. by intersecting the opening into the cavity. By intersecting the opening is meant that the recess which holds the intermediate portion of the wire spring extends into the opening from two opposite sides of the opening. In other words, the recess is formed in the end face and extends between an edge portion of the end face and the opening, and between the opening and another end face.

The intermediate portion may preferably be held in the recess in a manner which provides sufficient spring effect by elastic deformation of the wire spring to allow a guide tube to pass the spring until it reaches a position in the cavity in which the spring snaps back into a recess in the guide tube. This may be facilitated by providing the recess with a width which increases in the direction from the edge portion towards the opening.

In one embodiment, the yoke has a U-shape with a top portion being parallel to a bottom portion, the top and bottom portions being transverse to a centre portion. The yoke may preferably be dimensioned to that the solenoid precisely fits between the top and bottom portions with the lower end face and the upper end face both facing towards the inner surface of the yoke. In this embodiment, the intermediate portion of the wire spring can be arranged in the recess of the upper end face before the solenoid is arranged between the top and bottom portions. If the yoke is provided so that the solenoid fits between the top and bottom portions with a clearance which is less than the thickness of the wire spring, the top portion of the yoke prevents the wire spring from escaping the position in the recess, and the yoke thereby fixes the wire spring in the recess in the solenoid.

The U-shape of the yoke may in particular prevent movement of the solenoid relative to the yoke in directions which are transverse to the upper and lower end faces of the solenoid. To prevent movement of the yoke relative to the solenoid in other directions, the flange portion of the wire spring may comprise a locking portion which is engageable under spring force into a locking structure in the yoke. To provide the spring force which biases the locking portion of the wire spring into the locking structure of the yoke, the flange portion may further comprise a flexing portion with a spring function. The flexing portion could be located between the locking portion and the intermediate portion. The flexing portion could be sufficiently elastically deformable to enable movement of the locking portion between a position in which it is engaged in the locking structure of the yoke and a position in which it is disengaged in the locking structure of the yoke.

The flange portion may form first and second opposite end portions of the wire spring located on opposite sides of the intermediate portion, and at least a part, i.e. at least the flexing portion of the flange portion, extends transverse to the intermediate portion. The locking portions may terminate the spring axially in both ends, and they may extend transverse to the flexing portions, e.g. so that the free ends of the wire are towards each other. In one embodiment, the wire is ring shaped and therefore has no free ends. In this embodiment, the wire spring comprises only one locking portion with a flexing portion on opposite sides thereof.

In one embodiment, the flexing portions extend transverse to the intermediate portion and the locking portions extend parallel to the intermediate portion.

The wire spring may extend mainly in a flat plane, i.e. the fundamental two-dimensional object which can be defined by two intersecting straight lines, in the following mentioned as a securing plane. The securing plane may be parallel to a boundary plane between the solenoid and the yoke. The locking portion of the wire spring may, however, extend in an upward direction away from the securing plane to form at least one upward portion which can enter into a recess in the inner surface of the yoke. The upward portion may preferably be located between the axially opposite free ends of the wire spring and the flexing portions.

It may be desired that the locking portion engages relatively deeply into the yoke so that the locking portion must be moved a relatively large distance in a direction transverse to the securing plane. To disengage the yoke it may therefore be necessary to move the locking portion a corresponding large distance, e.g. in the range of 1-10 times the diameter of the wire from which the wire spring is made, in a direction away from the yoke.

To enable the relatively extensive movement of the locking portion, the flexing portion could be longer than the locking portion. As an example, the part of the wire which constitutes the flexing portion may have a length of 2-15 times, such as 4-12 times the length of the portion of the wire which constitutes the locking portion.

In a second aspect, the invention provides a wire spring for fixing a guide tube and a magnetic yoke to a solenoid, the spring being made from piece of an elastically deformable wire by bending to form a mid portion, an intermediate portion on each side of the intermediate portion, and two flange portions formed by axially opposite end portions of the piece of wire, wherein at least a part of each flange portion extends transverse to the intermediate portion.

The spring may comprise any of the features mentioned with respect to the first aspect of the invention. As an example, each flange portion may comprise at least one locking portion and at least one flexing portion, the locking portions terminating the spring axially and extending transverse to the flexing portions. The free ends of the wire may point towards each other, the flexing portions may extend transverse to the intermediate portions, and the locking portion may extend parallel to the intermediate portions. Furthermore, the flexing portions may be longer than the locking portions, and if the wire spring is ring shaped, i.e. with no free ends, it may form only one locking portion located between two flexing portions.

In a third aspect, the invention provides a valve with an actuator of the described kind.

In a fourth aspect, the invention provides a method of fixing a yoke detachably to a solenoid by use of a spring of the previously mentioned kind.

BRIEF DESCRIPTION OF THE DRAWINGS

Preferred embodiments of the invention will now be described in further details with reference to the drawing in which.

DETAILED DESCRIPTION OF THE PREFERRED EMBODIMENTS

FIGS. 1-6 relate to one embodiment of the invention and FIGS. 7-14 relate to another embodiment of the invention. The two embodiments are different with respect to details in the way the securing device engages the yoke. The difference will be described in further detail later.

Figure 1:
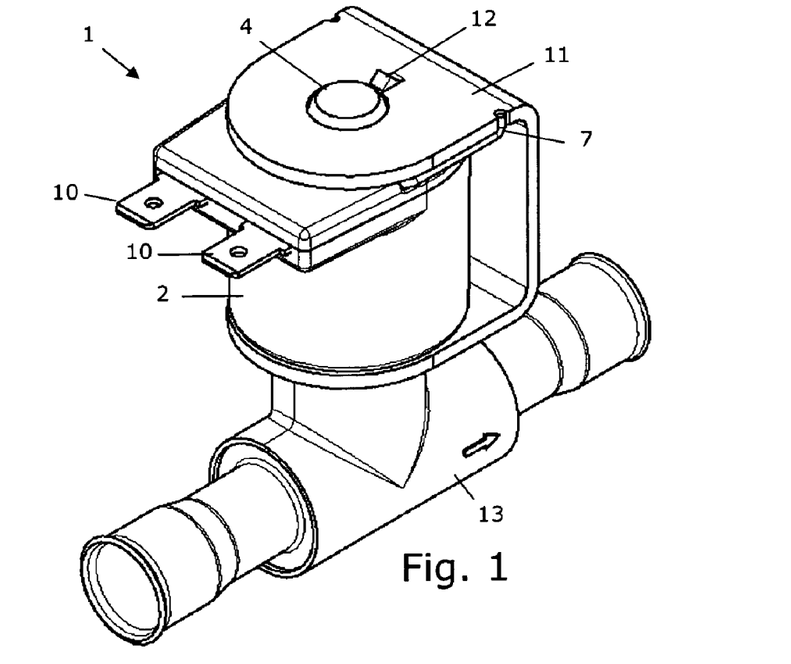
FIGS. 1 and 2 illustrate an actuator when attached to a valve.
Figure 2:
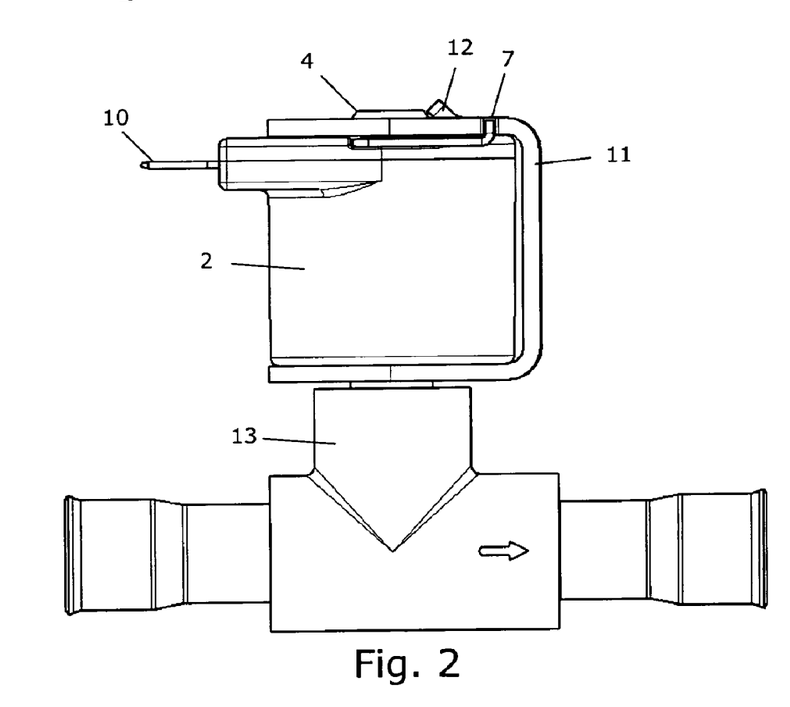
Figure 3:
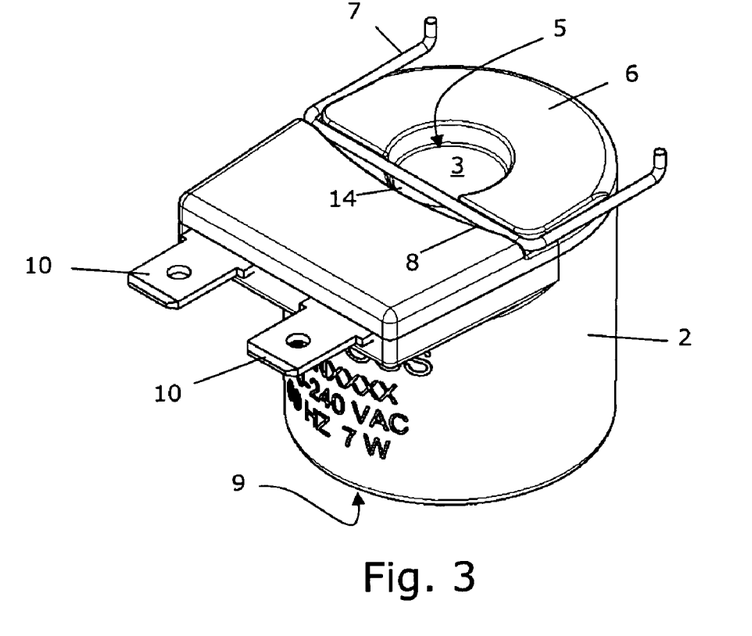
FIG. 3 illustrates the solenoid without the yoke.

Referring in the following in general to the FIGS. 1-6, the actuator 1 comprises a solenoid 2 with a cylindrical cavity 3 extending between a lower opening in a lower end face 9 and an upper opening in an upper end face 6. The guide tube 4 is inserted into the cavity via the lower opening (which is visible in FIGS. 16 and 17) and extends slightly out of the upper opening 5, c.f. FIG. 3 in the upper end face 6. The actuator comprises a securing device 7 in the form of a wire spring. The securing device is most clearly seen in FIG. 3 which illustrates the wire spring attached in a recess 8 in the upper end face 6 in the solenoid 2, and in FIG. 6 in which the wire spring is illustrated isolated.

The solenoid is powered via terminals 10, and the yoke 11 comprises an upward protrusion 12 which prevents attachment of the yoke in a wrong orientation relative to the valve 13.

Figure 16:
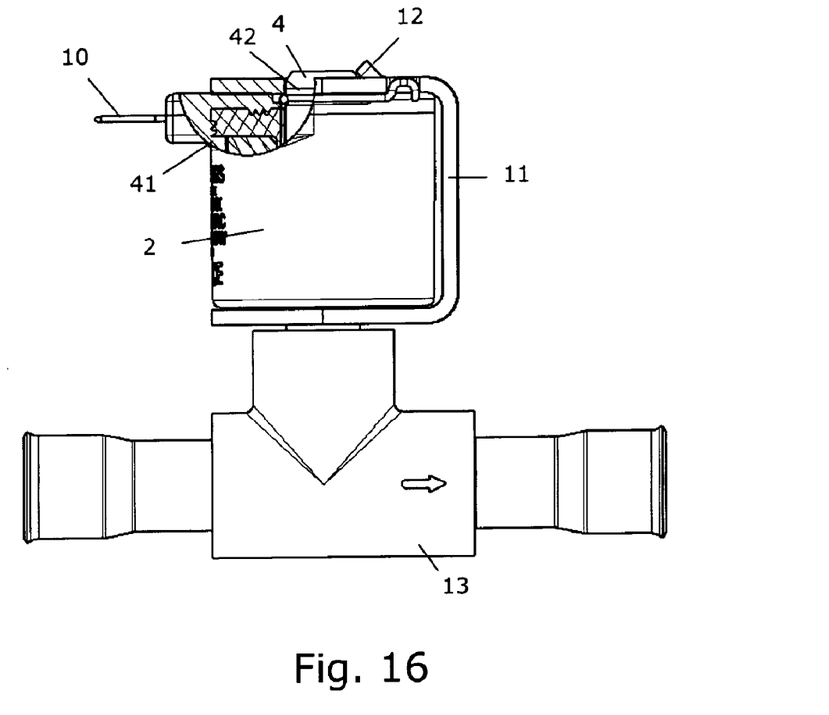
Figure 17:
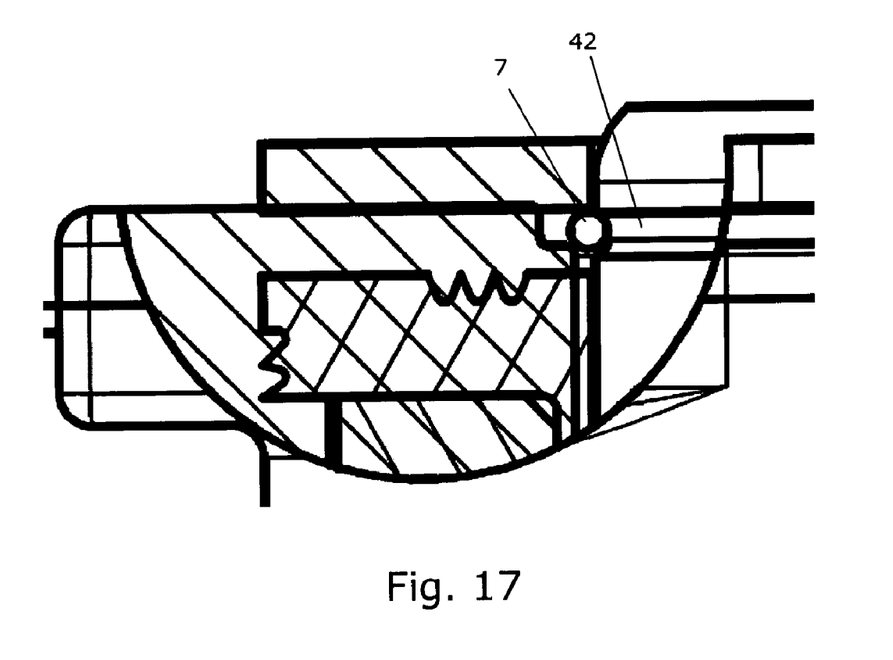

The guide tube 4 belongs to the valve 13 and comprises an indentation (visible in FIGS. 16 and 17). When the guide tube 4 is inserted in the cavity 3, it is engaged by the securing device 7 which, under spring force, is allowed to deform in the recess. For this purpose, the recess 8, as most clearly seen in FIG. 5, comprises a widened middle-section 14 which provides space for the deformation of a mid portion of the securing device 7. The recess 8 has a depth being in the size of the thickness of the securing device 7 so that the upper end face 6 is essentially flat.

Figure 4:
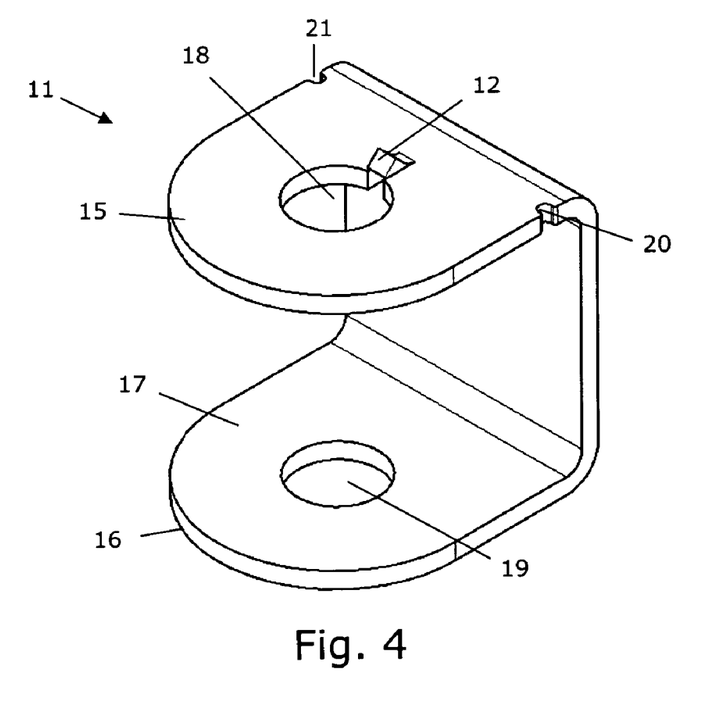
FIG. 4 illustrates the yoke without the solenoid.

As illustrated in FIG. 4, the yoke 11 is U-shaped and comprises a top portion 15 and a bottom portion 16 between which the solenoid fits precisely, and at least so that the clearance between the yoke 11 and the solenoid 2 is less than the thickness of the securing device 7. The yoke 11 has an inner surface 17, and when the solenoid 2 is inserted between the top and bottom portions 15, 16, the lower end face and the upper end face 6 both face towards the inner surface 17, and the clearance between the inner surface 17 and the lower end face and upper end face 6 is less than the thickness of the securing device 7 so that the securing device 7 cannot escape the recess 8. The top and bottom portions 15, 16 both comprise a through-hole 18, 19 through which the guide tube of a valve can be received. The yoke 11 comprises a locking structure constituted by two notches 20, 21 by engagement with which the securing device may lock the yoke 11 relative to the solenoid 2.

Figure 5:
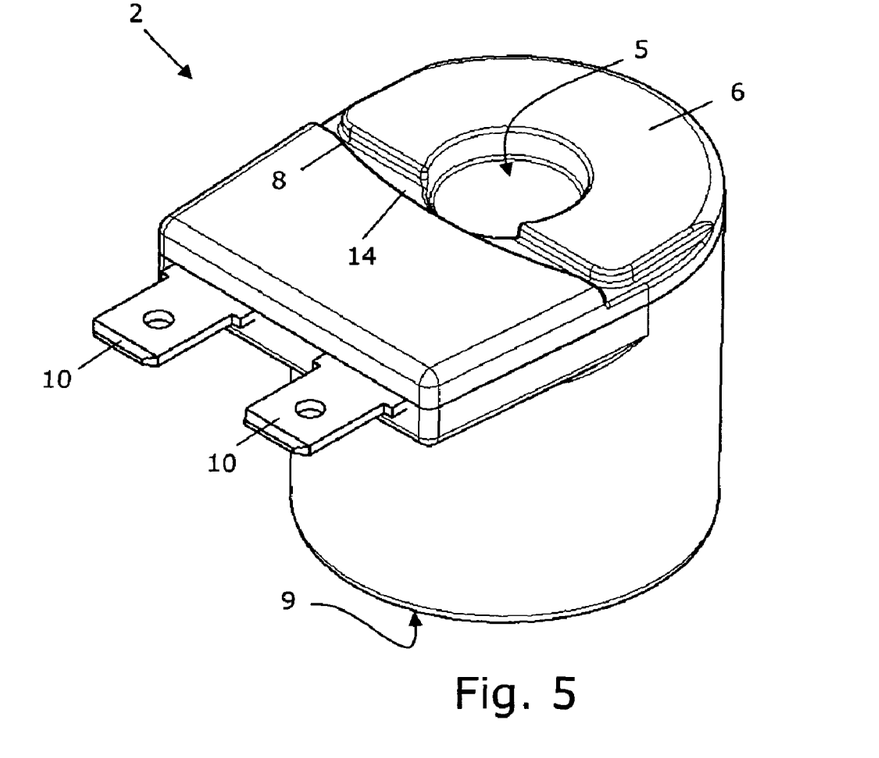
FIG. 5 illustrates the solenoid without the yoke and without the securing device.

FIG. 5 illustrates the solenoid 2 without the yoke and without the securing device whereby the widened middle-section 14 becomes more clearly visible.

Figure 6:
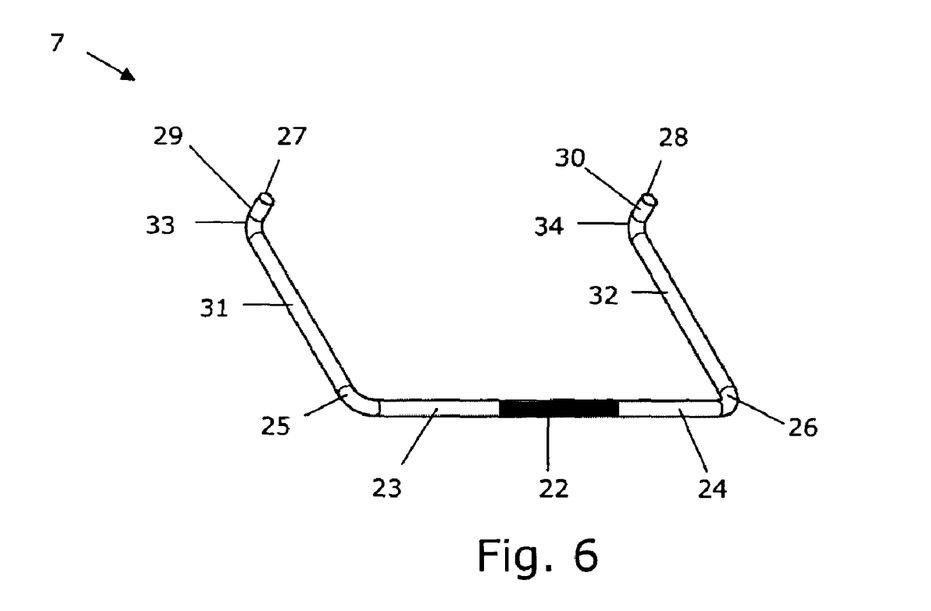
FIG. 6 illustrates the securing device.

FIG. 6 illustrates the securing device 7 in the form of a wire spring made from a single piece of a steel wire which is bent into the illustrated shape. The wire spring comprises a mid portion 22. The mid portion 22 is illustrated by a black colour, but in reality, it is simply a non distinctive portion of the wire which, when the wire is inserted in the recess 8 is that part of the wire which extends into the cavity 3 when the wire spring is arranged in the recess 8. The wire spring comprises an intermediate portion which forms first and second intermediate portions 23, 24 on opposite sides of the mid portion. The first and second intermediate portions 23, 24 are the portions at which the wire spring is held in place in the recess 8. The wire spring further comprises a flange portion forming first and second opposite flange end portions. The first and second flange end portions are defined as the portions of the wire extending between the bend areas 25, 26 of the wire spring and the free ends 27, 28 of the wire spring. The flange portion thereby encloses the intermediate portion 23, 24 and the mid portion 22. Each flange end portion comprises a locking portion 29, 30 and a flexing portion 31, 32. The flexing portions 31, 32 extend transverse to the intermediate portions 23, 24 (in the illustrated embodiment, the flexing portions 31, 32 extend perpendicular to the intermediate portions 23, 24 and to the mid portion 22), and the locking portions extend from the bended areas 33, 34 and terminate the spring axially (in the illustrated embodiment, the flexing portions 31, 32 extend perpendicular to the locking portions 29, 30). As clearly seen, the flexing portions are longer than the locking portions to enable a good flexibility when attaching the yoke 11, and thereby to facilitate a relatively deep engagement of the locking portion into a recess or notch in the yoke 11.

The intermediate portions 23, 24 are elastically deformable to enable movement of the mid portion 22 in the cavity 3. This enables the mid-portion 22 to be displaced under spring force from the intermediate portions 23, 24 during insertion of a guide tube into the cavity 3.

FIGS. 7-15 illustrate an alternative embodiment of the actuator. The actuator in FIGS. 7-15 differs only from the already described actuator in the way the securing device 7 interacts with the yoke 11. Equal numbers are therefore applied to all identical features, and reference is made to the description already provided for FIGS. 1-6.

Figure 13:
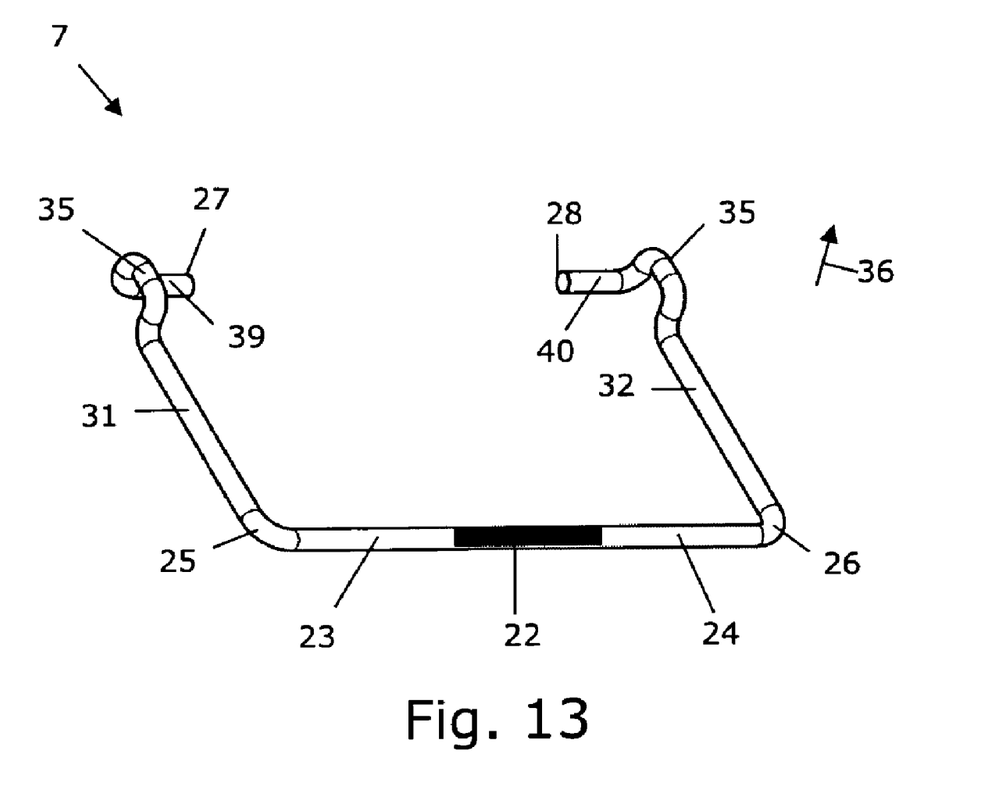
FIG. 13 illustrates the yoke for the embodiment of the actuator illustrated in FIGS. 7-12 without the solenoid.
Figure 14:
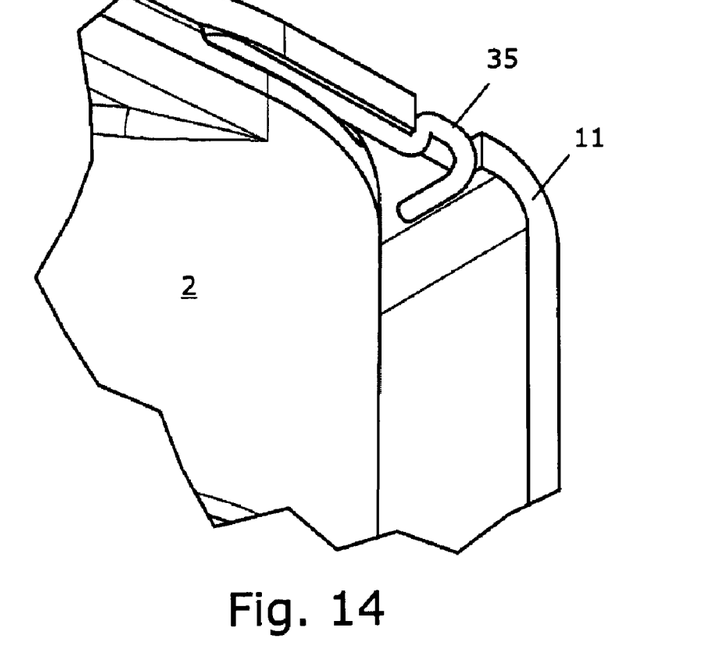
FIGS. 14 and 15 illustrate details of the engagement between the securing device and the yoke for the embodiment of the actuator illustrated in FIGS. 7-12, and FIGS. 16 and 17 illustrate a spring engaging a groove in a guide tube of a valve.
Figure 15:
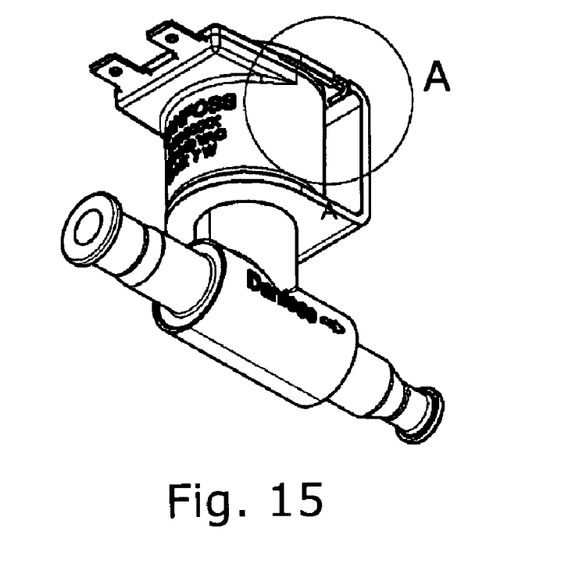

In accordance with the previously described embodiment, the alternative embodiment of the securing device 7 is a spring wire, e.g. made from a single piece of a wire by bending. In the alternative embodiment, the free ends 27, 28 of the wire point towards each other. The wire is bent to form upward portions 35 extending in an upward direction, symbolized by the arrow 36 from a flat plane in which the remaining portion of the wire spring is located, c.f. FIG. 13. The upward portions constitute to the locking portion and provide fixing of the wire spring in the yoke without exposing a potentially sharp free end of the wire. The free ends 27, 28 of the wire spring are held between the yoke 11 and the solenoid 2.

Figure 7:
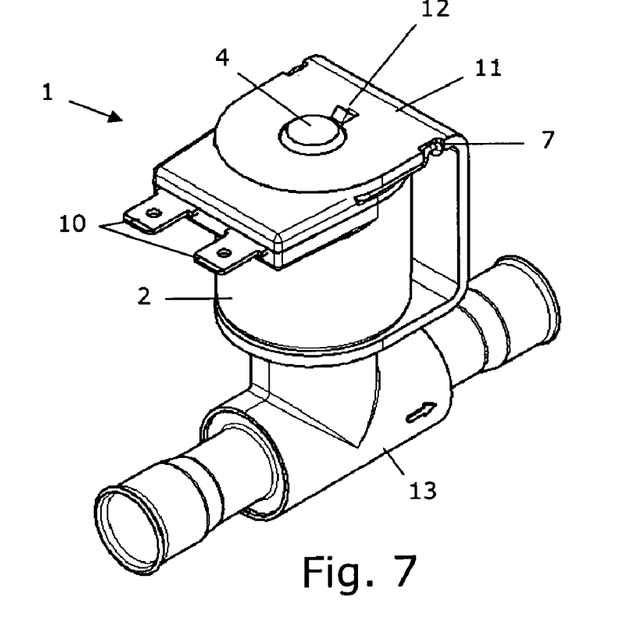
FIGS. 7 and 8 illustrate an alternative embodiment of an actuator when attached to a valve.
Figure 8:
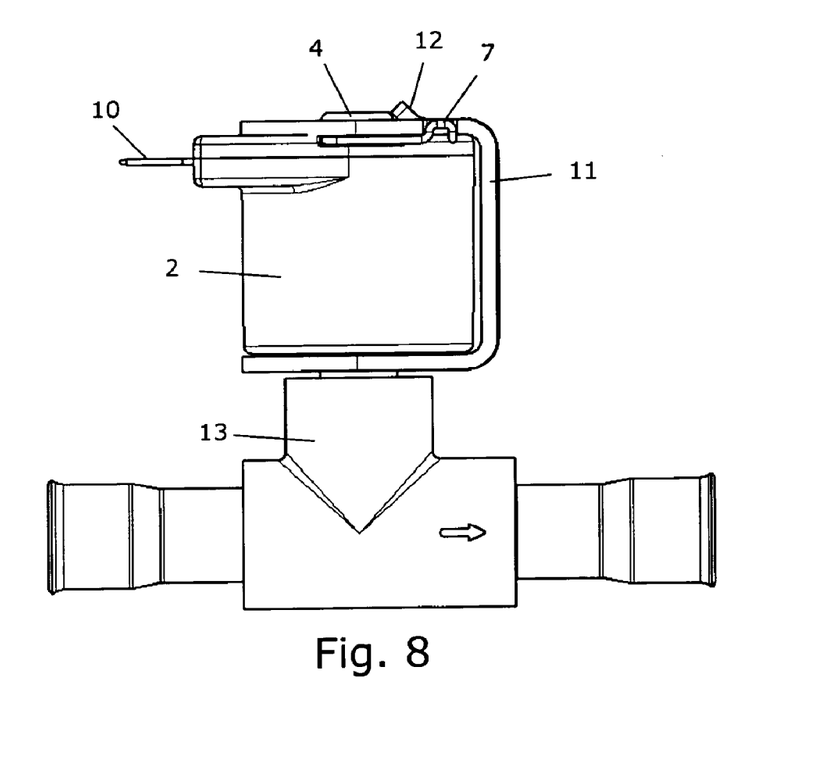
Figure 9:
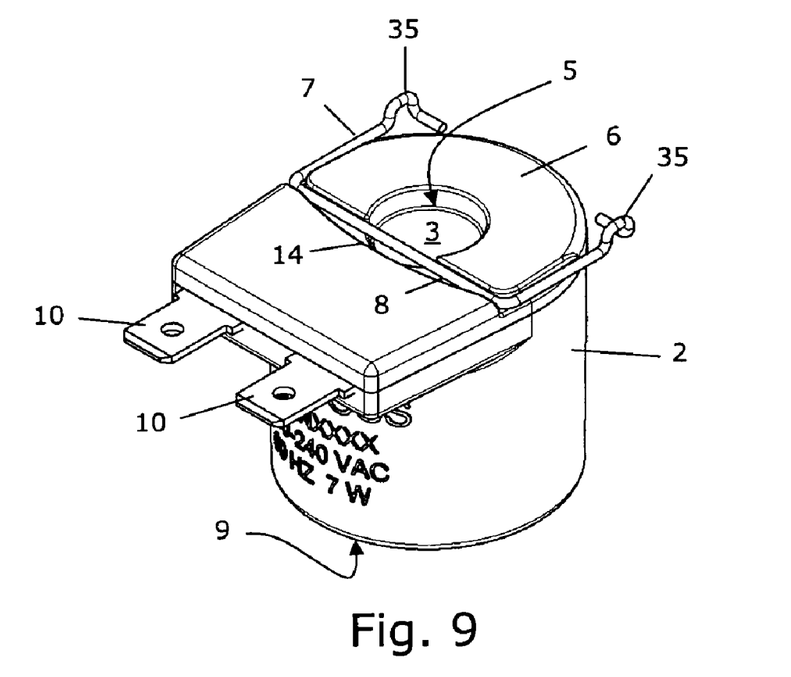
FIGS. 9-11 illustrates the solenoid of the embodiment of the actuator illustrated in FIGS. 7 and 8 without the yoke.
Figure 10:
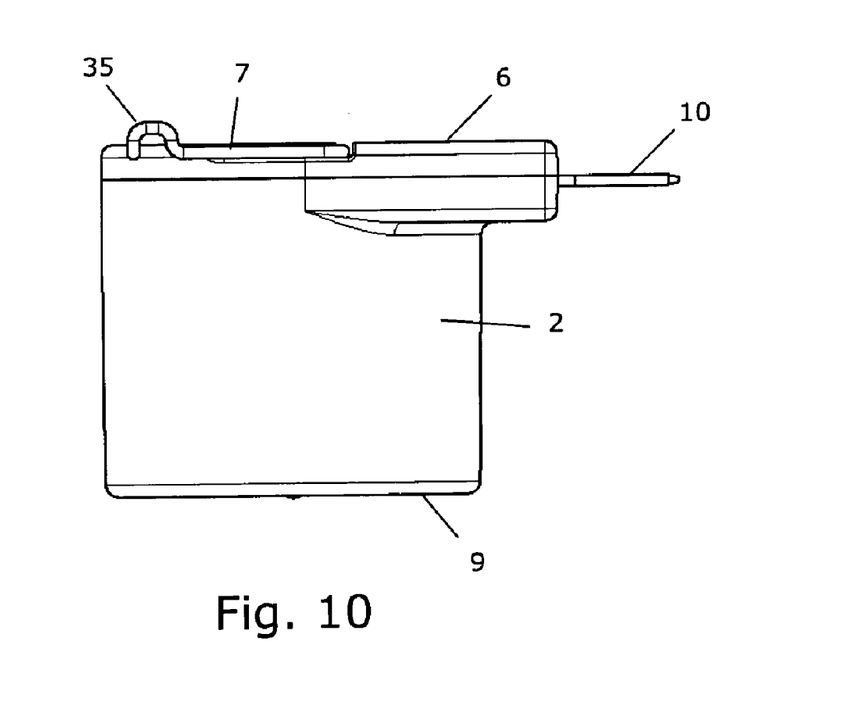
Figure 11:
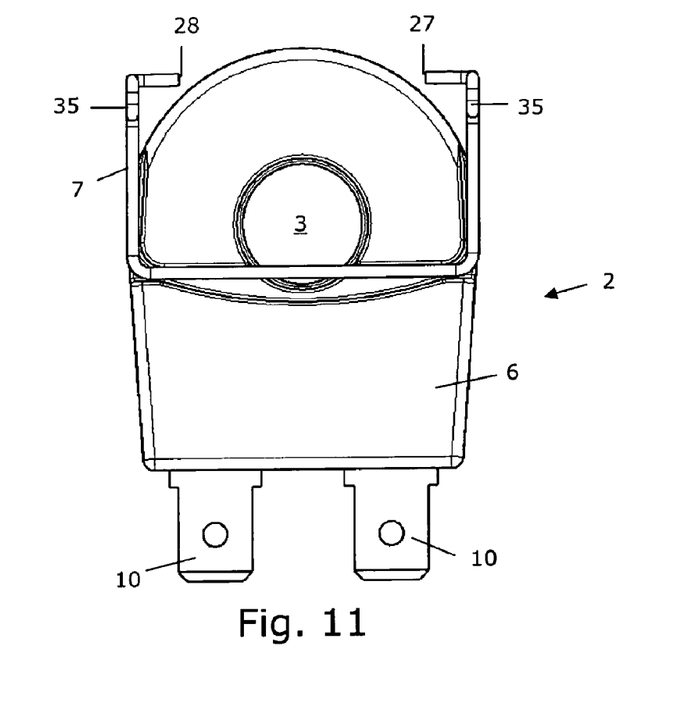
Figure 12:
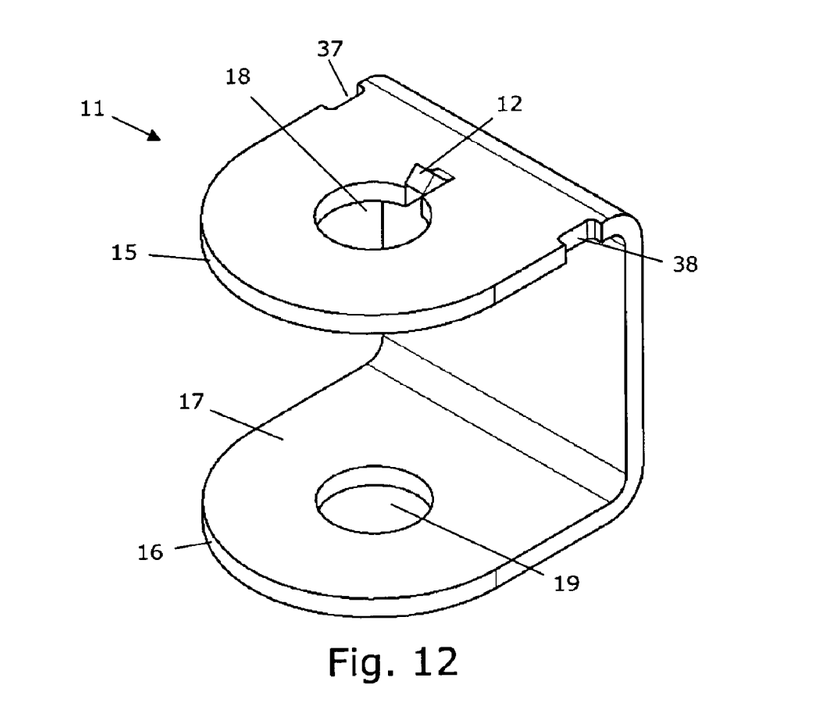
FIG. 12 illustrates the securing device for the embodiment of the actuator illustrated in FIGS. 7-11.

The upward portions 35 are received in notches 37, 38 in the yoke 11. The flexing portions 31, 32 provide flexibility to move the upward portions 35 into and out of the notches 37, 38, c.f. FIGS. 7, 8 and 12. The parallel portions 39, 40 are received in recesses in the yoke 11 and therefore further facilitate fixation of the yoke 11 to the solenoid 2.

FIG. 16 illustrates a valve 13, with a solenoid 2, a yoke 11, and a guide tube 4. Within the semi-circle 41, a part of the yoke 11 and a part of the solenoid 2 are illustrated in a cross-sectional view. The cross-sectional view shows the indentation 42 in which the mid portion of the wire spring is engaged. FIG. 17 illustrates an enlarged view of the area in which the wire spring 7 is engaged in the indentation 42. In this embodiment, the indentation is constituted by a circumferentially extending groove.

While the present invention has been illustrated and described with respect to a particular embodiment thereof, it should be appreciated by those of ordinary skill in the art that various modifications to this invention may be made without departing from the spirit and scope of the present.

What is claimed is:

1. An electromagnetic actuator comprising:
   a solenoid with a cylindrical cavity extending between a lower opening in a lower end face and an upper opening in an upper end face,
   a securing device attached in a recess in the upper end face and being engageable under spring force in an indentation in a guide tube which is located in the cavity, and
   a magnetic yoke with an inner surface facing towards the lower and upper end faces,
   wherein the securing device comprises a portion being engageable in the yoke to provide fixation of the yoke to the solenoid.

2. The actuator according to claim 1, wherein the recess extends tangentially to the upper opening.

3. The actuator according to claim 1, wherein the recess has a depth at least in the size of a thickness of the securing device, and wherein the inner surface abuts the upper end face.

4. The actuator according to claim 1, wherein the inner surface abuts the lower end face.

5. The actuator according to claim 1, wherein the securing device is formed from a single wire piece by bending.

6. A valve comprising an actuator according to claim 1.

7. The actuator according to claim 1, wherein the yoke comprises top and bottom portions between which the solenoid fits.

8. The actuator according to claim 7, wherein the securing device is secured in the recess in the upper end face by the inner surface of the yoke.

9. The actuator according to claim 1, wherein securing device extends generally in a flat securing plane which is parallel to a boundary surface between the solenoid and the yoke.

10. The actuator according to claim 9, wherein the securing device forms an upward portion extending in an upward direction from the securing plane into a recess in the yoke.

11. The actuator according to claim 10, wherein the upward portion is formed by an upwardly bended portion of a wire which constitutes the securing device.

12. The actuator according to claim 1, wherein the securing device is a wire spring.

13. The actuator according to claim 12, wherein the wire spring comprises a mid portion, an intermediate portion, and a flange portion, the wire spring being elastically deformable to facilitate movement of the mid portion in the cavity, the intermediate portion being received in a recess in the upper end face, and the flange portion being elastically deformable from a position in which at least a part thereof is engaged in a locking structure of the yoke towards a position in which it is disengaged in the locking structure.

14. The actuator according to claim 13, wherein at least a part of the flange portion extends transverse to the intermediate portion.

15. The actuator according to claim 13, wherein the recess comprises a widened middle-section facilitating movement of the mid portion.

16. The actuator according to claim 13, wherein the intermediate portion comprises first and second intermediate portions on opposite sides of the mid portion.

17. The actuator according to claim 16, wherein the first and second intermediate portions are parallel to each other or they are aligned with each other.

18. The actuator according to claim 13, wherein the locking structure comprises at least one indentation in an edge of the yoke.

19. The actuator according to claim 18, wherein the indentation has a depth at least in the size of a thickness of the wire spring to enable countersinking of the locking portion of the wire spring in the indentation.

20. The actuator according to claim 13, wherein the flange portion forms first and second opposite end portions of the wire spring, the end portions being on opposite sides of the intermediate portion.

21. The actuator according to claim 20, wherein each end portion comprises a locking portion and a flexing portion, the locking portions engaging the locking structure of the yoke and extending transverse to the flexing portions.

22. The actuator according to claim 21, wherein the free ends of the wire spring point towards each other.

23. The actuator according to claim 21, wherein the flexing portions extend transverse to the intermediate portion and at least parts of the locking portions extend parallel to the intermediate portion.

24. The actuator according to claim 21, wherein the flexing portions are longer than the locking portions.

25. The actuator according to claim 21, wherein the flexing portions are elastically deformable to provide movement of the flange portions in a direction parallel to a centre axis of the cavity.

26. A method of fixing a guide tube of a valve and a yoke to an solenoid, the method comprising:
bending a piece of an elastically deformable wire to form a wire spring comprising a mid portion, an intermediate portion on each side of the mid portion and two flange portions formed by axially opposite end portions of the piece of the elastically deformable wire, wherein at least a part of each flange portion extends transverse to the intermediate portions,
providing a yoke with a locking structure,
providing a valve with a guide tube having a recess for receiving the mid portion of the wire spring, and
attaching a locking portion of the wire spring to the yoke by engagement of the locking portion in the locking structure of the yoke.

\* \* \* \* \*